United States Patent [19]
Haire et al.

[11] Patent Number: 5,098,115
[45] Date of Patent: Mar. 24, 1992

[54] CONVERTER DOLLY FOR PERMITTING BACKING UP OF TANDEM TRAILERS

[75] Inventors: Darrell K. Haire; Andrew R. Haire, both of Thomasville, N.C.

[73] Assignee: A.M. Haire Truck Bodies, Inc., Thomasville, N.C.

[21] Appl. No.: 524,146

[22] Filed: May 15, 1990

Related U.S. Application Data

[63] Continuation of Ser. No. 249,113, Sep. 23, 1988, abandoned.

[51] Int. Cl.$^5$ .................. B62D 53/00; B62D 53/10
[52] U.S. Cl. .................. 280/476.1; 280/408; 280/418.1; 280/432; 280/901; 280/DIG. 14
[58] Field of Search ............ 280/476.1, 432, DIG. 14, 280/901, 408, 418.1

[56] References Cited

U.S. PATENT DOCUMENTS

| | | | |
|---|---|---|---|
| 2,309,204 | 1/1943 | Nelson | 280/476.1 |
| 2,344,921 | 3/1944 | McDaniel | 280/474 |
| 2,376,001 | 5/1945 | Nogle | 280/476.1 |
| 2,495,943 | 1/1950 | Peterson | 280/476.1 |
| 2,590,962 | 4/1952 | Gurton | 280/476.1 |
| 2,639,159 | 5/1953 | Milligan | 280/476.1 |
| 2,816,776 | 12/1957 | Nimtz | 280/423 |
| 3,556,560 | 1/1971 | Adams | 280/476.1 |
| 3,963,265 | 6/1976 | Kornoelje et al. | 280/432 |
| 4,119,330 | 10/1978 | Capps | 280/432 |
| 4,120,514 | 10/1978 | Sanders | 280/432 |
| 4,365,820 | 12/1982 | Rush | 280/408 |
| 4,556,232 | 12/1985 | Sever | 280/432 |
| 4,573,699 | 3/1986 | Smith | 280/432 |
| 4,775,165 | 10/1988 | Grovum | 280/432 |

Primary Examiner—Mitchell J. Hill
Attorney, Agent, or Firm—Bell, Seltzer, Park & Gibson

[57] ABSTRACT

A converter dolly for interconnecting and facilitating backing up of a tandem trailer assembly pulled by a tractor is disclosed. The converter dolly is coupled to the rear of a first trailer for pivotable movement relative thereto about a substantially vertical axis. The converter dolly includes a wheeled frame. A fifth wheel is fixed on the wheeled frame and has a front end defining opposing front corner portions. The wheeled frame includes a coupling assembly for coupling the wheeled frame to a second trailer for pivotable movement about a substantially vertical axis. A locking mechanism cooperates with the fifth wheel and includes a spaced pin housing secured at each front corner portion of the fifth wheel so that when the fifth wheel pivots up or down, the housings move as units with the fifth wheel. A pin is positioned in each housing and movable therein from a retracted to an extended position.

5 Claims, 1 Drawing Sheet

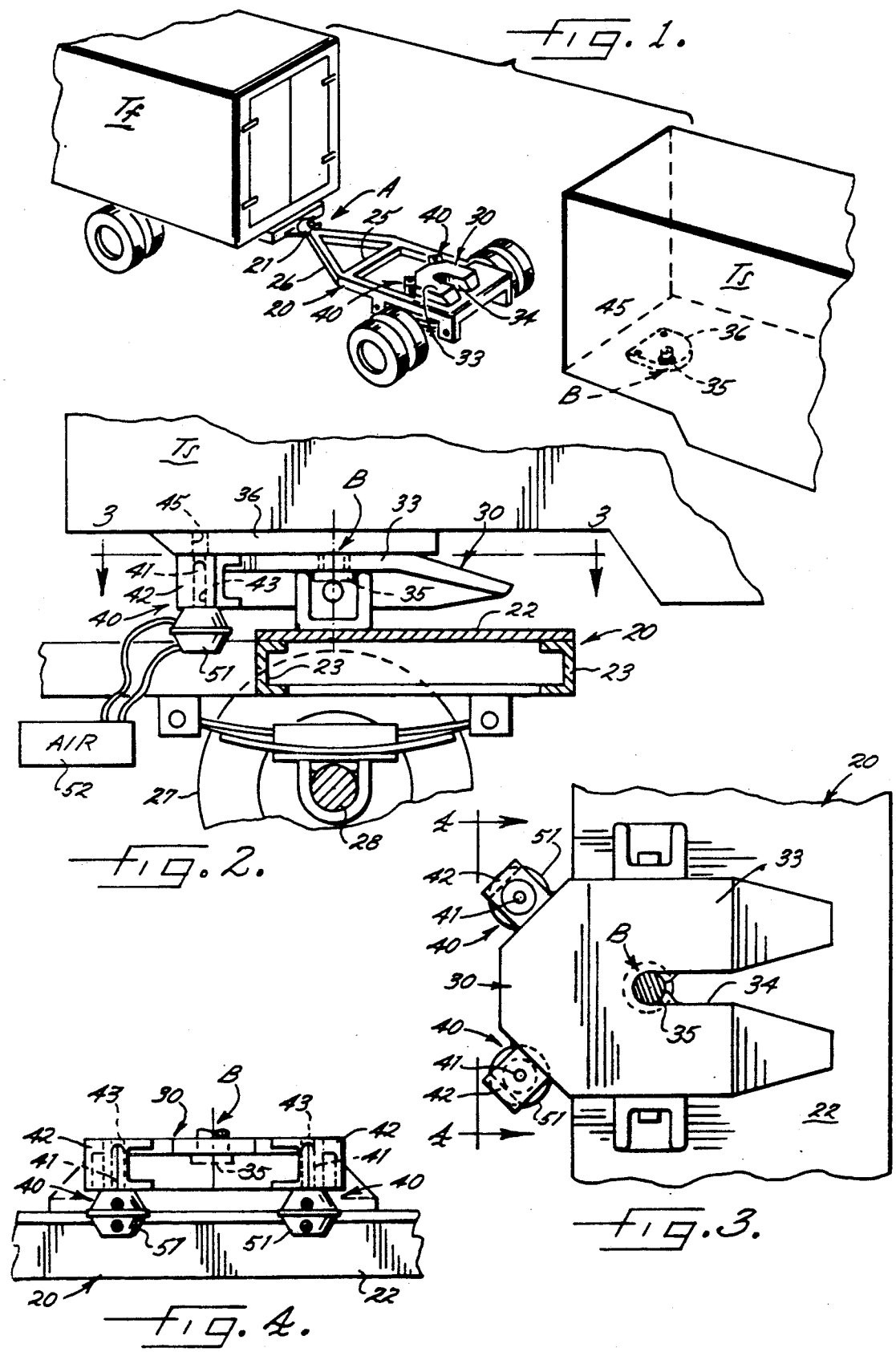

CONVERTER DOLLY FOR PERMITTING BACKING UP OF TANDEM TRAILERS

This application is a continuation of application Ser. No. 07/249,113, filed Sept. 23, 1988, now abandoned.

FIELD AND BACKGROUND OF THE INVENTION

The present invention relates to tandem trailers pulled by a single truck tractor and the difficulties encountered in backing up these trailers.

Over the past few years, the use of tandem trailers has become popular and more are used on the road than ever before. The tandem arrangement permits a single truck to double its hauling capability. This is particularly important in the moving industry wherein it is desirable to move furniture in one trailer and move an automobile in the second trailer whereas in the past the automobile either had to be driven to the destination or towed behind the first trailer.

In operation, the first trailer is connected to the tractor using a fifth wheel and kingpin arrangement commonly known in the art. The second trailer is conventionally attached to the first trailer using a dolly carrying a second fifth wheel. This arrangement does not significantly increase the cost to pull the two trailers and there is little or no loss in maneuverability so long as the tractor and trailers are traveling in a forward direction.

A problem occurs, however, when the driver of the tractor desires to back up the trailers such as when delivering or picking up a load. The trailers must be disconnected from one another and backed up separately. This is due to the arrangement of pivot points between the tandem trailers and between the front trailer and tractor. When the tractor and trailers are traveling forward there are three pivot points about which the tractor and trailers pivot, namely a pivot point between the tractor and the first trailer, a pivot point between the first trailer and the dolly, and a pivot point between the converter dolly and the second trailer. This arrangement permits the driver to make smaller radius turns, but does not permit the tractor to be backed up without disconnecting the trailers from each other. This is impractical because connecting and disconnecting the trailers every time the trailer needs to be backed up is time-consuming and thus expensive to do.

SUMMARY OF THE INVENTION

In accordance with the present invention, applicants provide a converter dolly for connecting tandem trailers which eliminates the problem of having to disconnect the trailers from one another when it is desired to back up the trailers. The converter dolly is adapted to be coupled to the rear of a first trailer for pivotal movement about a substantially vertical axis. The dolly comprises a wheeled frame, a fifth wheel carried by the wheeled frame and having means for coupling the first trailer to a second trailer for pivotal movement about a substantially vertical axis, and locking means cooperating with the fifth wheel. The locking means includes means movable between a retracted, inactive position for permitting pivotal movement of the second trailer about the vertical axis during normal driving operations and an extended, active position for engagement with the second trailer to restrain the second trailer against pivotal movement about the axis during backing up of the trailer. This maintains a fixed relationship between the second trailer and the dolly and thereby obviates the need for disconnecting the trailers from one another when backing up the tandem trailer assembly.

BRIEF DESCRIPTION OF THE DRAWINGS

The foregoing and other objects, features and advantages of the present invention will be made apparent from the following detailed description of the preferred embodiment of the invention, and from the drawings, in which:

FIG. 1 is a perspective view of a pair of trailers and the converter dolly of the present invention connecting them;

FIG. 2 is an enlarged side elevation view of the invention illustrating the converter dolly connected to the second trailer.

FIG. 3 is a top plan view taken along line 3—3 of FIG. 2.

FIG. 4 is an elevation view taken along line 4—4 of FIG. 3.

DETAILED DESCRIPTION OF THE INVENTION

The present invention now will be described more fully hereinafter with reference to the accompanying drawings, in which preferred embodiments of the invention are shown. This invention can, however, be embodied in many different forms and should not be construed as limited to the embodiments set forth herein; rather, applicant provides these embodiments so that this disclosure will be thorough and complete, and will fully convey the scope of the invention to those skilled in the art.

As illustrated in FIG. 1, a converter dolly is generally indicated by the reference numeral 10, and the dolly 10 interconnects a front first trailer $T_f$ and a rear second trailer $T_s$. This tandem trailer assembly is pulled by a truck tractor (not shown). The first trailer can be connected to the tractor using a fifth wheel and kingpin arrangement commonly known in the art or the first trailer can be integral with the tractor chassis. The dolly is particularly suited for use to facilitate backing up the trailers together without disconnecting them. As illustrated in FIGS. 2-4, the converter dolly comprises a wheeled frame 20, a fifth wheel 30 carried by the wheeled frame 20 and a locking means 40 cooperating with the fifth wheel 30. The wheeled frame 20 is adapted to be coupled to the rear of the front first trailer of at point A for relative movement thereto about a first substantially vertical axis using hitch means 21 such as a ball coupling, ball socket or pintle hook arrangements commonly known in the art. The wheeled frame includes a base portion 22 fabricated of spaced apart metal bars 23, a cross brace bar 25, and a tongue portion 26 carrying the hitch means 21. The wheeled frame 20 is mounted on one or more ground engaging wheels 27 carried by an axle 28.

The fifth wheel 30 is carried by the wheeled frame 20 and includes means for coupling the wheeled frame 20 to the rear second trailer $T_s$ for pivotable movement about a second vertical axis at point B. The means for coupling preferably includes a plate portion 33 having a longitudinal slot 34 formed centrally therein and adjacent to its front end. A kingpin 35 projecting from a bearing plate 36 located on the underside of the second trailer $T_s$ is received in the longitudinal slot 34 and is locked therein at point B in a manner well understood in the art.

This arrangement typically results in three pivot points, the pivot point between the tractor and the first trailer $T_f$ (not shown), the pivot point between the first trailer $T_f$ and the dolly 10 (point A) and the pivot point between the dolly 10 and the second trailer $T_s$ (point B). This type of arrangement does not permit backing of tandem trailers. The present invention with the use of locking means 40, eliminates the pivot point at point B and permits the tandem trailers to be backed up.

The locking means 40 preferably includes a pair of pins 41 in a housing 42 which is carried by the fifth wheel 30 so that when the fifth wheel 30 pivots up or down, the pins 41 and housing 42 will move as a unit with the fifth wheel 30. This prevents the pins 41 from being sheared off or broken due to the pins staying in a fixed position relative to the fifth wheel when the fifth wheel pivots, creating a shear force against the pins. The pins 41 are movable between a retracted inactive position in apertures 43 in the housing 42 located on the front corner portions of the fifth wheel (FIG. 3), to an extended active position. When the pins 41 are extended to the active position, they are received in apertures 45 located in the underside of the second trailer $T_s$, and preferably as illustrated received in apertures located in the bearing plate 36 of the second trailer $T_s$. The retracted inactive position permits pivotal movement of the second trailer $T_s$ about an axis during normal driving operations of the tractor and trailers in a forward direction, whereas the extended active position restrains the second trailer $T_s$ against pivotal movement during backing up of the trailers.

The pin may be extended by motor means such as a fluid powered motor using pneumatic or hydraulic methods known in the art. A preferred method as shown in the figures is to use a pneumatic system cooperating with the pins 41 wherein a diaphragm 51, in communication with an air pressure source 52, moves the pins 41 pneumatically to the extended and locked position. The control means for the pneumatic system may be remotely actuated and may be installed for convenience in the cab of the tractor.

In operation when the driver desires to travel in a backward direction, he remotely actuates the control means to engage the diaphragm 51 to extend the pins 41 to an active position and the pins are received in apertures 45 of the underside bearing plate 36. This eliminates pivot point B, restrains the second trailer against pivotable movement about an axis during backing up and maintains a fixed relationship between the second trailer $T_s$ and the dolly 10. The tandem trailers can now be backed up without disconnecting the trailers. This arrangement also has a minimal amount of "cheat" or sliding of the wheels sideways when the trailers are being backed up around a corner, thus the driver may accurately back the trailer up.

While particular embodiments of the invention have been described, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

That which is claimed is:

1. A tandem trailer assembly comprising; a first wheeled vehicle, hitch means carried by a rearmost portion of said first vehicle, a second wheeled trailer vehicle positioned in tandem behind said first vehicle and including a coupling member comprising a kingpin projecting from an underside of said second trailer vehicle and a converter dolly positioned between and interconnecting said first and second vehicles, said converter dolly comprising a frame including a base portion and a tongue portion extending forwardly from the base portion, hitch means carried by said tongue portion and connected to said hitch means on said first vehicle to permit pivotal movement of the dolly relative to said first vehicle about a first substantially vertical axis, ground engaging wheels carried by said frame, a fifth wheel fixed on said base portion of said frame and having a front end defining opposing front corner portions, and comprising a longitudinal slot formed therein and adjacent to its front end and receiving the second trailer vehicle kingpin to interconnect the converter dolly to said second trailer vehicle to permit pivotal movement of the second trailer vehicle relative to said dolly about a second substantially vertical axis, and locking means cooperating with said fifth wheel and with said second wheeled trailer vehicle, said locking means including a spaced pin housing secured at each front corner portion of the fifth wheel so that when the fifth wheel pivots up or down, the housings move as units with the fifth wheel, a pin positioned in each housing and movable therein from a retracted to an extended position, and motor means operatively connected to said housing and cooperating with said pins to move them between retracted, inactive positions for permitting free pivotal movement of said second trailer vehicle relative to said dolly about said second substantially vertical axis during normal driving operations and extended, active positions in engagement with said second trailer vehicle during backing up of the tandem trailer assembly to restrain said second trailer vehicle against pivotal movement relative to the dolly whereby said dolly and said second trailer vehicle operate as a non-articulated unit and pivoting is only permitted about said first substantially vertical axis to thereby permit backing up the tandem trailer assembly without the need for disconnecting the first and second vehicles.

2. A converter dolly according to claim 1 wherein said motor means is a fluid powered motor.

3. A tandem trailer assembly according to claim 2 wherein said fluid powered motor comprise a pneumatic system including a diaphragm in communication with an air pressure source.

4. A converter dolly according to claim 1 wherein said motor means includes a remotely actuatable by control means.

5. A tandem trailer assembly according to claim 1 wherein the underside of the second trailer vehicle includes apertures for receiving the pins when the pins are in an extended, active position.

* * * * *